United States Patent [19]

Johnson

[11] Patent Number: 4,856,328

[45] Date of Patent: Aug. 15, 1989

[54] SAMPLING PROBE FLOW SENSOR

[75] Inventor: Stewart D. Johnson, Stockton, Ill.

[73] Assignee: Honeywell Inc., Minneapolis, Minn.

[21] Appl. No.: 213,376

[22] Filed: Jun. 30, 1988

[51] Int. Cl.⁴ .............................................. G01F 1/68
[52] U.S. Cl. .................................... 73/202; 73/204.21
[58] Field of Search ................... 73/202, 202.5, 204.21

[56] References Cited

U.S. PATENT DOCUMENTS

| | | | |
|---|---|---|---|
| 4,412,449 | 11/1983 | Eiermann et al. | 73/204.21 |
| 4,457,169 | 7/1984 | Lauterbach et al. | 73/202.5 |
| 4,776,213 | 10/1988 | Blechinger et al. | 73/202 |

Primary Examiner—Joseph A. Orsino
Assistant Examiner—Hollis T. Chen
Attorney, Agent, or Firm—Charles L. Rubow

[57] ABSTRACT

A mass air flow sensor having a tubular probe body located within and aligned with a venturi passageway. The probe body has a channel therethrough connecting openings located at high and low pressure regions in the venturi passageway. The openings are configured to cause at least a 90 degree change in direction of air flowing therethrough from the venturi passageway to protect a fragile flow sensor in the channel from damage by suspended contaminants.

16 Claims, 2 Drawing Sheets

SAMPLING PROBE FLOW SENSOR

BACKGROUND OF THE INVENTION

The invention disclosed herein relates generally to flow sensing apparatus, and more particularly to a method and probe design for shielding a fragile flow sensor from contaminants in the flow being sensed while maintaining desirable performance characteristics.

Recent advancements in micro machining techniques have led to the development of solid state flow sensors of a type having a thin film heater and at least one thin film heat sensor suspended over a depression etched in a silicon substrate. Such sensors, referred to as microbridge flow sensors, are mass producible, very small and of potentially very low cost. In addition, such sensors are capable of very fast response. Reference may be made to U.S. Pat. No. 4,478,076 issued Oct. 23, 1984 in the name of P. J. Bohrer, and publications cited therein, for a detailed description of the fabrication techniques, structure and performance characteristics of microbridge sensors.

Basic sensors of the above-described type are sensitive to mass air flow, which is a parameter of considerable importance in a number of applications, including combustion control systems, and particularly including the control of fuel-air mixtures in internal combustion engines in which it is necessary to determine the mass air flow into a mixing or combustion chamber.

One of the problems encountered in utilizing microbridge mass air flow sensors in automotive applications is the presence of particulate matter, oil droplets and other contaminants in the air flow. Microbridge sensors are, in some respects, inherently quite fragile, and are subject to impact damage. Even through the combustion air is filtered to remove particulate matter and other contaminants, the air flow past the sensor may, nevertheless, have contaminants suspended therein. The air volume flow rate into an internal combustion engine is typically quite high, and may approach 1000 Kg/Hr. Contaminants carried in this air flow can destroy a microbridge sensor. Accordingly, precautions must be taken to prevent contaminants from impacting the sensor element.

Various techniques and probe designs have been devised in attempts to alleviate the foregoing problem. For example, the sensor element may be protected by its own dedicated filter, or the sensor element may be positioned or structure provided so that the element is located out of the main air stream.

These techniques and arrangements, though more or less effective in protecting the sensor element, introduce other problems. Filter type arrangements generally provide increased impedance to fluid flow, thus affecting a sensor's performance and generally decreasing its sensitivity to the total air mass passing the sensor location. Placing the sensor element out of the main air stream generally decreases its ability to sense the mass flow rate of interest.

SUMMARY OF THE INVENTION

The present invention is a sensor for sensing fluid flow through a venturi passageway where the fluid may contain suspended contaminants capable of inflicting impact damage on a flow detector. The flow detector is located within a channel in a tubular element, the channel connecting first and second openings at opposite ends of the tubular element. The tubular element is mounted to the venturi passageway so that the first and second openings are located at high and low pressure regions respectively. The pressure differential between the first and second openings causes fluid to flow from the passageway into the first opening and through the channel. The first opening is configured so that fluid entering thereat must undergo at least a 90° change in flow direction. The sensor may be operated either in a mode in which flow through the channel is in the opposite direction of flow through the passageway, or in a mode in which flow through the channel is in the same direction as flow through the passageway.

The present invention also includes a method of protecting a flow sensor element subject to impact damage from contaminants suspended in a fluid, while permitting flow of the fluid to be sensed. The method involves providing a venturi passageway through which flows the fluid and providing a tubular element having inlet and outlet ports therein connected by a channel extending along an axis, at least the inlet port being configured to cause fluid entering thereat to flow substantially radially with respect to the axis. A flow sensor element is mounted within the channel and the tubular element is mounted within the venturi passageway with the inlet and outlet ports located in regions of high and low pressure within the venturi passageway.

DESCRIPTION OF THE PREFERRED EMBODIMENT

Figure 1:
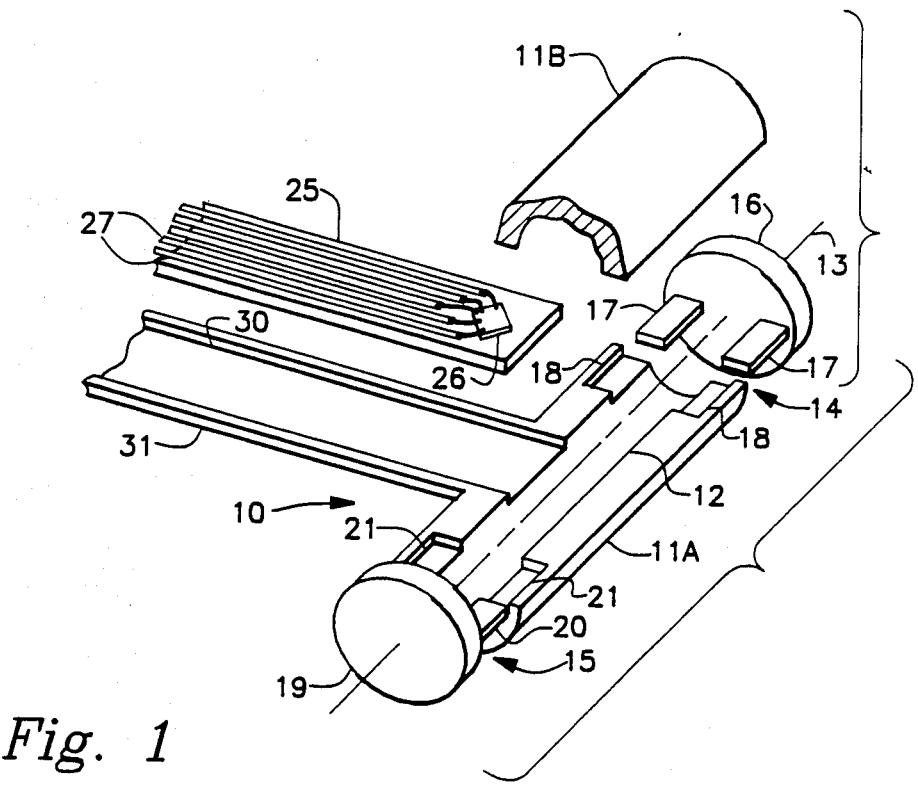
FIG. 1 is an exploded perspective view of a flow sensor device in accordance with the applicant's invention.

In FIG. 1, reference numeral 10 generally identifies a flow sensor device in accordance with the applicant's invention. The device is shown as a generally tubular body or element of which halves on opposite sides of a horizontal plane are identified by reference numerals 111A and 11B. The housing has a channel 12 therethrough extending along an axis 13 which provides fluid communication between openings or ports generally identified by reference numerals 14 and 15.

As shown in FIG. 1, openings 14 and 15 are formed by gaps between the ends of the body and a pair of end caps. Specifically, opening 14 is formed by a gap between one end of body 11A/11B and an end cap 16 which is mounted to the body by means of a pair of studs 17 which project into recesses 18 in the body. Similarly, the opening 15 at the opposite end of channel 12 is formed by a gap between an end of body 11A/11B and an end cap 19 which is attached to the body by means of a pair of studs, of which one is identified by reference numeral 20, projecting into recesses 21 in the body.

Flow through channel 12 is generally aligned with axis 13. The gaps between the ends of body 11A/11B and the end caps are made sufficiently small that flow through the gaps is substantially radial with respect to axis 13. In operation, flow sensor device 10 is mounted in fluid whose flow is to be sensed with axis 13 generally aligned with the direction of fluid flow. The fluid may contain suspended particles and other contaminants which could inflict impact damage on a fragile flow sensing element or detector. However, by mounting the flow sensing element or detector within channel 12, it is protected from such damage by the fact that fluid flowing through the channel must make at least a 90° bend in order to gain entry. A particle massive enough to damage the flow sensor element would most likely have sufficient kinetic energy along the direction of flow past body 11A/11B to prevent it from entering ports 14 or 15.

Reference numeral 25 identifies a thick film network on a ceramic substrate having a microbridge flow sensor die 26 mounted on one end thereof. Substrate 25 also has shown thereon conductors 27 for carrying signals and power between die 26 and external utilization apparatus (not shown), which may be a fuel control system for an internal combustion engine.

Substrate 25 is configured to fit within a shallow groove 30 in a strut 31 by which flow sensor device 10 can be mounted to any desired structure. With substrate 25 in place, die 26 is substantially centered within channel 12.

Figure 2:
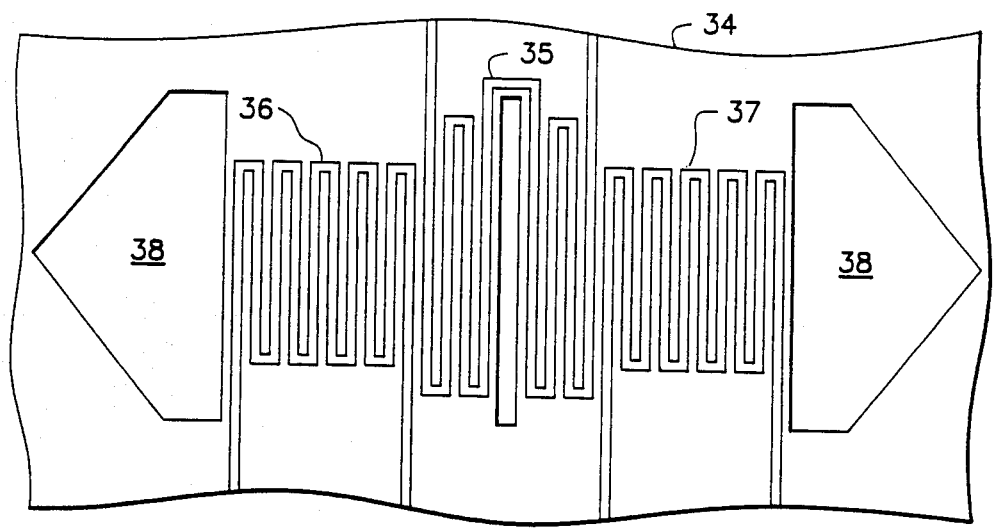
FIG. 2 is a plan view of a microbridge flow sensor element of a type suitable for use in the flow sensor device of FIG. 1.

An embodiment of sensor element or die 26 suitable for use in the disclosed flow sensing device is shown in FIG. 2 in which reference numeral 34 identifies a portion of a silicon die having a pattern of thin film elements formed thereon. The thin film elements include a centrally located heater 35 and a pair of heat sensors 36 and 37 on opposite sides thereof. After the thin film elements are formed on die 34, a depression 38 extending under heater 35 and heat sensors 36 and 37 is etched into the die, leaving the thin film elements suspended over the depression. Such a detector can be inexpensively mass produced using well known semiconductor fabrication techniques.

The flow sensing device shown in FIG. 1 is bidirectional and can sense flow in either direction along axis 13 equally well. However, a pressure differential between ports 14 and 15 is required in order to effectively cause a portion of the fluid flowing past sensor device 10 to flow through channel 12.

Figure 3:
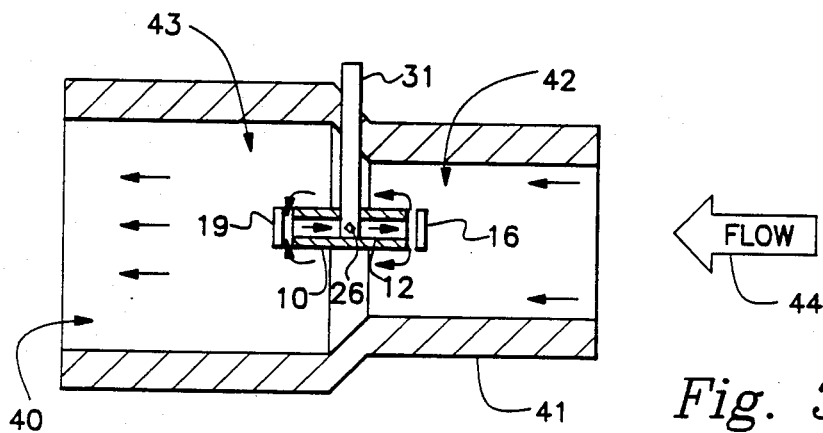
FIG. 3 is a schematic view of the flow sensor device of FIG. 1 mounted in a venturi passageway and showing a first mode of operation.
Figure 4:
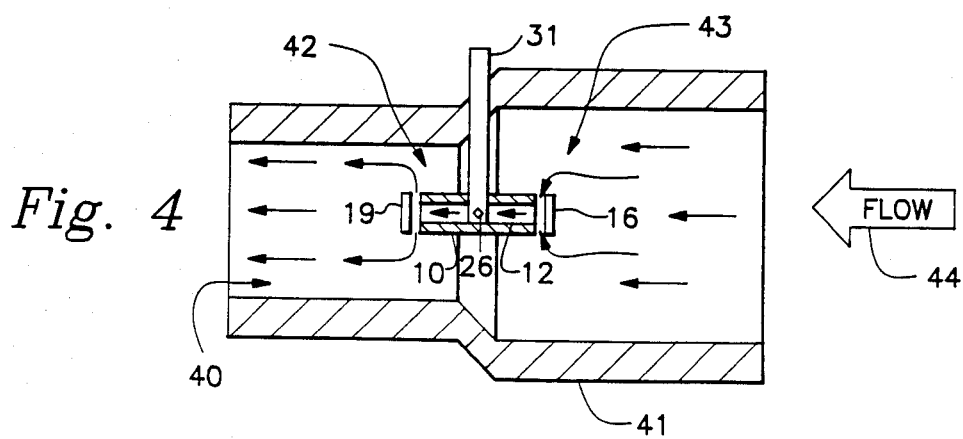
FIG. 4 is a schematic view of the flow sensor device of FIG. 1 mounted in a venturi passageway, and showing a second mode of operation.

FIGS. 3 and 4 illustrate how the flow sensor device of FIG. 1 can be used in a venturi passageway for sensing flow therethrough. The venturi passageway is generally identified by reference numeral 40. It is formed within a member 41 which provides a first cross sectional area at a first location 42 along the path of fluid flow and a second cross sectional area larger than the first cross sectional area at a second location 43 along the path of fluid flow. As fluid flows through passageway 40, a pressure differential between locations 42 and 43 is created by the Bernoulli effect, with the larger pressure coinciding with the lower flow velocity at the location of the larger cross sectional area.

In the mode of operation shown in FIG. 3, the direction of air flow identified by reference numeral 44 is from the smaller diameter section of the venturi passageway to the larger diameter section thereof. Therefore, the pressure differential between ports 14 and 15 of flow sensor device 10 is such as to result in flow through channel 12 in a direction opposite the direction of fluid flow through passage 40.

In the mode of operation shown in FIG. 4, the flow of air is from a larger diameter section within passageway 40 to the smaller diameter section thereof. This results in flow through channel 12 in the same direction as the flow through passageway 40.

In either mode of operation, the pressure differential between ports 14 and 15, and hence the flow velocity and mass flow through channel 12 is proportional to the mass flow past flow sensor device 10. Accordingly, sensor element 26 in channel 12 produces an output indicative of mass flow through passageway 40.

A specific embodiment of the applicant's invention has been shown and described for internal combustion engine control system applications. In this embodiment a fragile flow sensor element is protected from impact damage by contaminants suspended in the fluid whose flow is to be sensed. This protection is provided by locating the sensor element within a channel requiring the flow to make at least a 90° bend which effectively excludes particles with high kinetic energy. The tendency of such an arrangement to reduce air flow past the sensor element is eliminated by utilizing the Bernoulli effect to draw fluid past the sensor element.

Although a specific embodiment of the applicant's invention has been shown and described for illustrative purposes, a variety of other modifications and features which do not depart from the applicant's contemplation and teaching will be apparent to those of ordinary skill in the relevant arts. It is not intended that coverage be limited to the disclosed embodiment, but only by the terms of the following claims.

I claim:

1. A flow sensor comprising:
   a member with a hole therethrough for providing a fluid flow passageway, the hole having a first cross sectional area at a first location along the fluid flow path and a second cross sectional area smaller than the first cross sectional area at a second location downstream from the first location;
   a tubular element having a signal flow channel therethrough of which the principal portion extends along an axis, the signal flow channel connecting an inlet port to an exit port, the inlet port oriented at substantially a right angle to the axis;
   means for mounting said tubular element within the hole in said member so that the axis of said tubular element is substantially aligned with the direction of fluid flow through the hole and so that the inlet and exit ports are at the first and second locations respectively within the hole; and
   a flow detector mounted in the signal flow channel in said tubular element.

2. The flow sensor of claim 1 wherein the inlet port in said tubular element is configured to cause fluid entering thereat to flow substantially radially with respect to the axis of said element.

3. The flow sensor of claim 2 wherein the flow detector is of the type having a thin film heater and at least one thin film heat sensor suspended in the fluid flowing through the signal flow channel in said tubular element.

4. The flow sensor of claim 3 wherein said means for mounting said tubular element within the hole in said member comprises at least one strut extending from said member to said tubular element, said strut being adapted to provide for transmission of signals between said flow detector and external utilization apparatus.

5. A sensor for sensing flow of a fluid having contaminants suspended therein by means of a detector subject to impact damage by the contaminants, comprising:

means defining a fluid flow passageway for the fluid whose flow is to be sensed, the passageway having a first cross sectional area at a first location along the path of fluid flow and having a second cross sectional area different from the first cross sectional area at a second location spaced from the first location along the path of fluid flow;

a tubular element located in the fluid flow passageway, said tubular element having first and second openings therein at the first and second locations respectively and a channel connecting the first and second openings, whereby a pressure differential is created between the first and second openings to cause fluid to flow from the passageway into one of the first and second openings and through the channel in said tubular element, the one of the first and second openings through which fluid enters being configured so that fluid entering thereat must undergo at least a 90° change in flow direction; and a flow detector mounted in the channel in said tubular element.

6. The sensor of claim 5 wherein:

said tubular element extends along an axis generally aligned with the path of fluid flow through the passageway; and the one of the first and second openings in said tubular element through which fluid enters is configured to cause fluid entering thereat to flow substantially radially with respect to the axis of said tubular element.

7. The sensor of claim 6 wherein the first cross sectional area of the fluid flow passageway is larger than the second cross sectional area thereof and the direction of flow through said passageway is from the second location toward the first location, whereby fluid in the channel in said tubular element is caused to flow in a direction opposite the direction of fluid flow through the passageway.

8. The sensor of claim 6 wherein the first cross sectional area of the fluid flow passageway is smaller than the second cross sectional area thereof and the direction of flow through said passageway is from the second location toward the first location, whereby fluid in the channel in said tubular member is caused to flow in the same direction as fluid flow through the passageway.

9. The sensor of claim 7 wherein the second opening in said tubular element is configured to cause fluid leaving therethrough to flow substantially radially with respect to the axis of said tubular element.

10. The sensor of claim 8 wherein the second opening in said tubular element is configured to cause fluid leaving therethrough to flow substantially radially with respect to the axis of said tubular element.

11. The sensor of claim 6 wherein the flow detector is of the type having a thin film heater and at least one thin film heat sensor suspended within the channel in said tubular element.

12. A flow sensor comprising:

a member having hole therethrough extending along an axis, the hole having a first cross sectional area at a first location along the axis and a second cross sectional area smaller than the first cross sectional area at a second location along the axis;

a tubular element positioned within the hole and having a longitudinal dimension along the axis, said tubular element having a channel therethrough terminating in the other end in a port in said element at the second location; and a flow detector located in the channel in said tubular element;

a flow detector wherein the port of said tubular element at the first location is configured to cause fluid therethrough to flow substantially radially with respect to the axis.

13. The flow sensor of claim 12 wherein the flow detector is of the type having a thin film heater and at least one thin film heat sensor suspended within the channel in said tubular element.

14. A method of protecting a fragile flow sensor from impact damage resulting from contaminants in a fluid whose flow is being sensed, comprising the steps of:

forming a venturi passage through which the fluid whose flow is to be sensed is permitted to flow, the venturi passage creating a first pressure at a first location therealong and a second pressure different from the first pressure at a second location therealong spaced from the first location;

forming a tubular element having a channel aligned with an axis and providing fluid communication between an inlet port and an outlet port, the inlet and outlet ports being configured to cause fluid flowing therethrough to flow substantially radially with respect to the axis;

mounting the flow sensor in the channel in the tubular element; and mounting said tubular element in the venturi passage with the inlet and outlet ports located at the first and second locations respectively along the venturi passage.

15. The method of claim 13 wherein said flow sensor is of the type having a thin film heater and at least one thin film heat sensor suspended in the channel within said tubular element.

16. The method of claim 15 wherein the cross section of the venturi passage varies from a first cross sectional area at the first location to a second cross sectional area smaller than the first cross sectional area at the second location; and the direction of flow through the venturi passage is from the second location toward the first location along the venturi passage.

* * * * *